Dec. 14, 1954

W. J. BROWN 2,697,194

SATURABLE REACTOR MOTOR CONTROL SYSTEM

Filed Aug. 17, 1949

*INVENTOR.*
WALTER J. BROWN
BY Woodling and Krost
*his Attys*

Dec. 14, 1954  W. J. BROWN  2,697,194
SATURABLE REACTOR MOTOR CONTROL SYSTEM
Filed Aug. 17, 1949

INVENTOR.
WALTER J. BROWN
BY
Woodling and Krost
his attys.

Dec. 14, 1954

W. J. BROWN 2,697,194

SATURABLE REACTOR MOTOR CONTROL SYSTEM

Filed Aug. 17, 1949.

INVENTOR.
WALTER J. BROWN
BY
Woodling and Kroot
his attys

Dec. 14, 1954    W. J. BROWN    2,697,194
SATURABLE REACTOR MOTOR CONTROL SYSTEM
Filed Aug. 17, 1949    6 Sheets-Sheet 4

INVENTOR.
WALTER J. BROWN
BY Woodling and Kost
his Attorneys

Dec. 14, 1954 — W. J. BROWN — 2,697,194
SATURABLE REACTOR MOTOR CONTROL SYSTEM
Filed Aug. 17, 1949 — 6 Sheets-Sheet 5

INVENTOR.
WALTER J. BROWN

Dec. 14, 1954

W. J. BROWN 2,697,194

SATURABLE REACTOR MOTOR CONTROL SYSTEM

Filed Aug. 17, 1949

INVENTOR.
WALTER J. BROWN
BY
Woodling and Kvost
his attys.

United States Patent Office 2,697,194
Patented Dec. 14, 1954

2,697,194
SATURABLE REACTOR MOTOR CONTROL SYSTEM

Walter J. Brown, Cleveland Heights, Ohio

Application August 17, 1949, Serial No. 110,812

15 Claims. (Cl. 318—327)

The invention relates in general to control-systems using saturable reactors for controlling the power supplied to an electrical load, and in particular to their use as part of a variable impedance network for controlling the output of a converter to a load.

This application is related to my copending applications filed concurrently herewith, entitled, "Control Systems Using Multiple Winding Saturable Reactors," and "Saturable Reactors Using Permanent Magnets."

An object of the invention is to provide a saturable reactor for controlling the power supplied to an electrical load wherein the saturable reactor is supplied with controlling asymmetric magnetizing energy and also derives controlled asymmetric magnetizing energy from the load through a passive network or by passive connection to the load.

Another object of the invention is to provide a saturable reactor in a variable impedance network or a phase shifting network which controls a converter, preferably including a space discharge device, for supplying power to a load wherein the saturable reactor is supplied with controlling asymmetric magnetizing energy and also derives controlled asymmetric magnetizing energy from the load through a passive network or by passive connection to the load.

In this specification, the term "passive network" is a network which contains no amplifier and may include one or more circuit elements. A "passive connection" likewise means a connection containing no amplifier but may include a direct connection without any impedance elements whatever. The term "conductively derived" means "derived by conductive connection with or without impedances."

Another object of the invention is to provide a control system wherein the controlling asymmetric magnetizing energy may be a permanent magnet, or alternatively may be a direct current source connected to a separate direct current winding on the saturable reactor, or alternatively may be a separate direct current source which is combined in opposition to the asymmetric electromotive force obtained from the load so as to apply a resultant electromotive force to one direct current winding on the saturable reactor.

A further object of the invention is to provide a saturable reactor used for controlling the electric power supplied to a load, wherein the saturable reactor is supplied with controlling asymmetric magnetizing energy, and derives controlled asymmetric magnetizing energy from the load, which energies combine to produce a resultant asymmetric magnetomotive force in the core of said reactor, and means to inhibit reversal of said asymmetric magnetomotive force.

A further object of the invention is to inhibit such reversal by means of a rectifier connected in series with a winding on said reactor.

A further object of the invention is to inhibit such reversal by means of a rectifier connected in parallel with a winding on said reactor.

A further object of the invention is to inhibit such reversal by means of a rectifier connected between two windings on said core.

A further object of the invention is to inhibit the effect of such reversal by a polarizable control device such as a polarized armature cooperating with the magnetic field from the core of the saturable reactor.

Another object of the invention is to provide a control circuit for a power converter supplying electric power to a load which control circuit includes a phase shifting network having an inductance which is the alternating current winding of a saturable reactor and wherein the saturable reactor is subjected to a controlled asymmetric electromotive force obtained by passive connections from the load, and is also subjected to controlling asymmetric magnetizing energy.

A further object of the invention is to provide a control system as in the preceding paragraph in which the saturable reactor is connected in any one of the phase shifting circuits described in my copending applications: "Phase Shift System," Serial No. 770,968, filed Aug. 28, 1947, now Patent No. 2,524,761, issued October 10, 1950; "Phase Shift Network," Serial No. 770,966, filed Aug. 28, 1947, now Patent No. 2,524,759, issued October 10, 1950; "Phase Shift Bridge," Serial No. 770,967, filed Aug. 28, 1947, now Patent No. 2,524,760, issued October 10, 1950; and "Phase Shift Circuit," Serial No. 779,909, filed Oct. 15, 1947, now Patent No. 2,524,762, issued October 10, 1950.

A further object of the invention is to provide a control system for controlling the electric power supplied to a load comprising a saturable reactor having direct current winding means connected to a source of controlling asymmetric electromotive force, and to sources of controlled asymmetric electromotive force derived respectively from impedances in parallel and in series with the load.

A further object of the invention is to provide a control system as in the preceding paragraph, whereby the electromotive force derived from the series impedance produces a compounding effect.

A further object of the invention is to provide a control system, as in the preceding paragraph but one, whereby the electromotive force derived from the series impedance is applied to said winding means through a polarized control device or rectifier only when the load current exceeds a predetermined value for the purpose of limiting said load current, either in the forward and/or reverse direction.

A further object of the invention is to provide a control system, as in the preceding paragraph but two, wherein two or more of the functions of load voltage control, compounding and current limiting are combined in a single direct current coil on the reactor.

A still further object of the invention is to provide a control system including a saturable reactor including a direct current winding connected to a source of controlling asymmetric electromotive force and to a source of controlled electromotive force passively derived from the load, and including a rectifier either in series or parallel with said winding.

A further object of the invention is to provide a control system including a saturable reactor having a direct current winding connected to a source of controlling asymmetric electromotive force, a second direct current winding connected to a source of controlled electromotive force passively derived from the load, and a rectifier connected between said two windings.

A still further object of the invention is to provide a control circuit for a power converter supplying electric power to a load, which control circuit includes a phase shifting network and has as a variable element thereof the alternating current winding of a saturable reactor, and wherein the saturable reactor has one or more direct current windings thereon passively connected to the load for obtaining asymmetric electromotive forces therefrom in accordance with various load conditions.

Another object of the invention is to provide a control system of any of the kinds above mentioned, in which the load comprises the armature or field of a generator or motor, in conjunction with a tachometer if desired.

Another object of the invention is to provide a control system of the kind described, for the purposes of controlling the output of a space discharge power converter to a load.

A still further object of the invention is to provide such a control system for a converter comprising a motor-generator or other power driven generator controlled by a space discharge device.

Other objects and a fuller understanding of the invention may be had by referring to the following description and claims, taken in conjunction with the accompanying drawings, in which:

Figure 8:
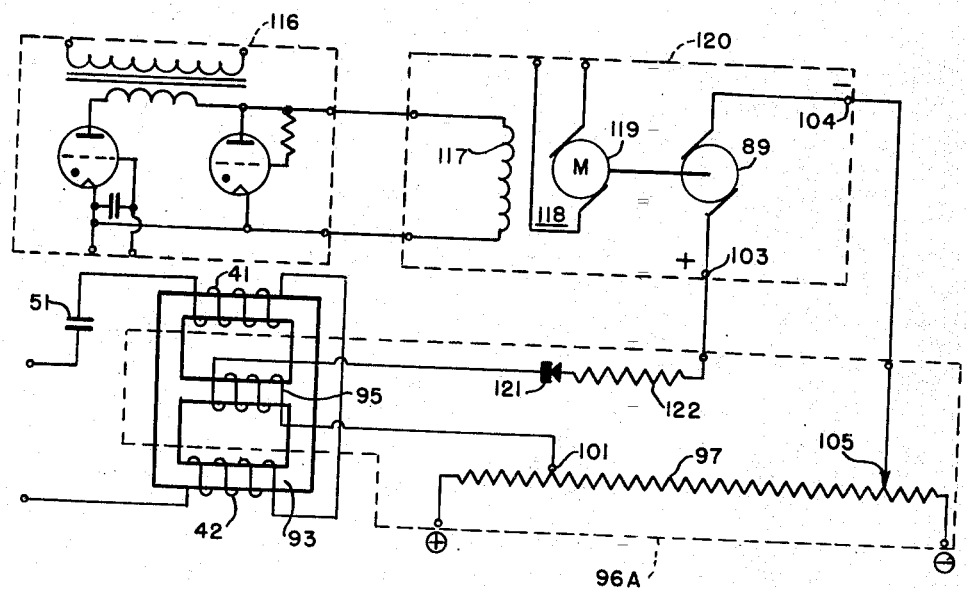
Figure 7:
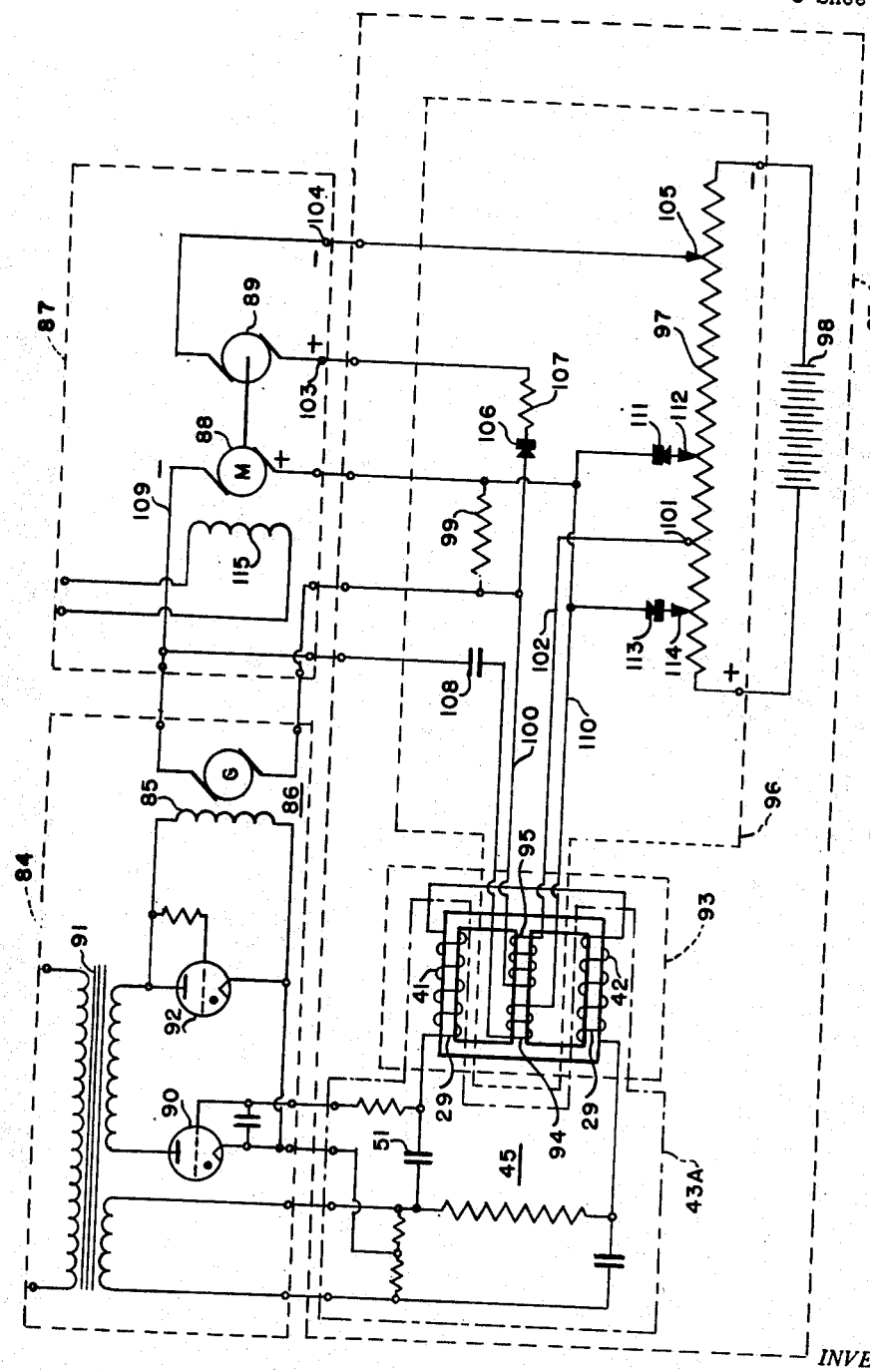
Figure 10:
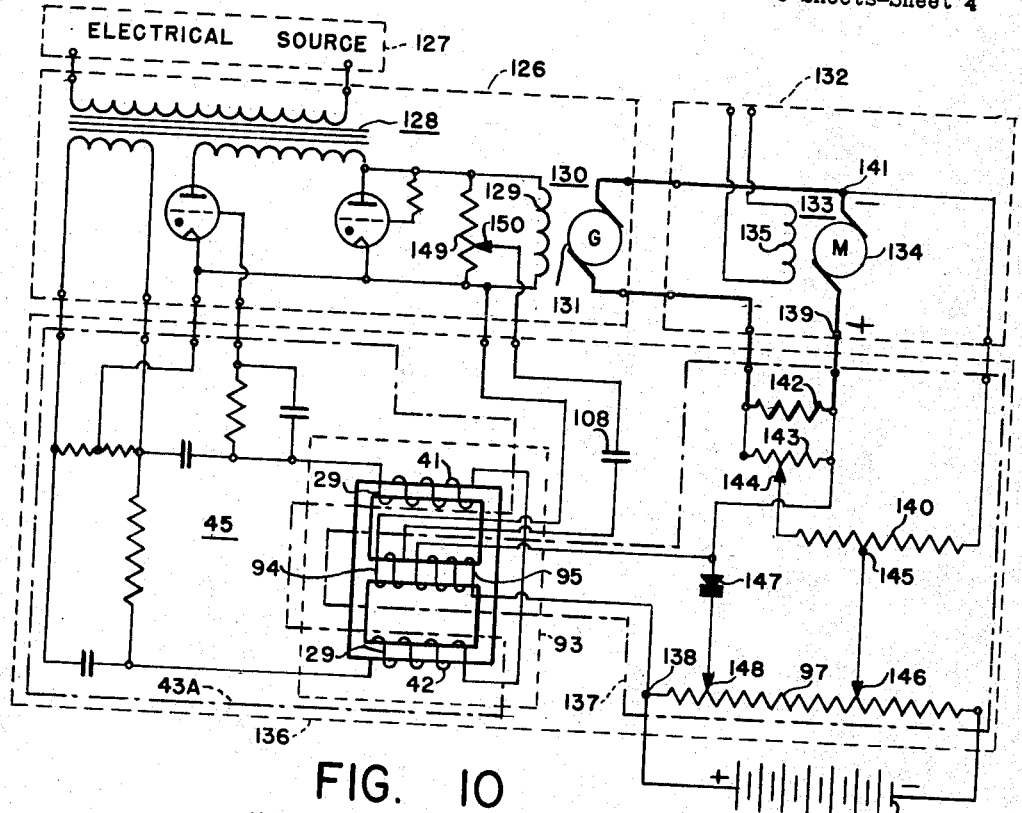
Figure 9:
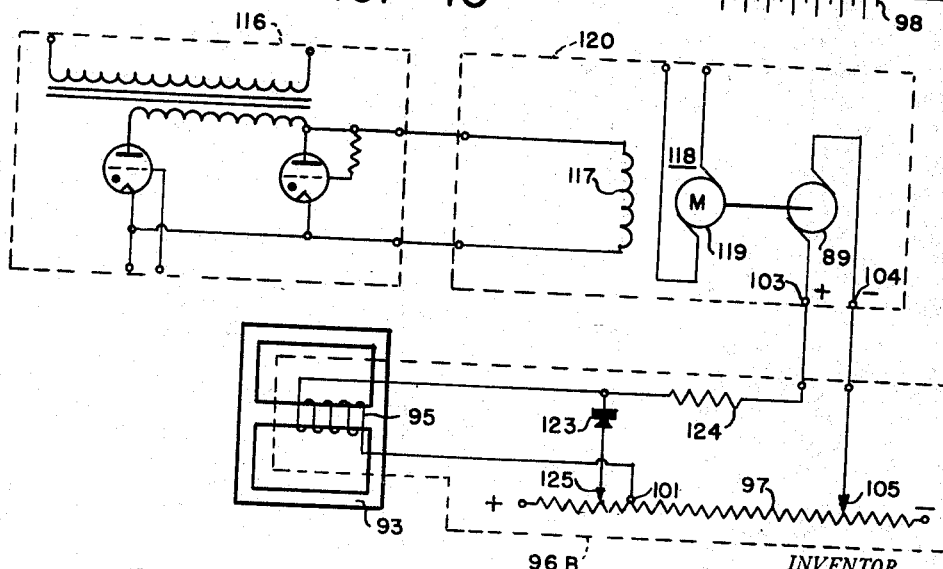
Figure 11:
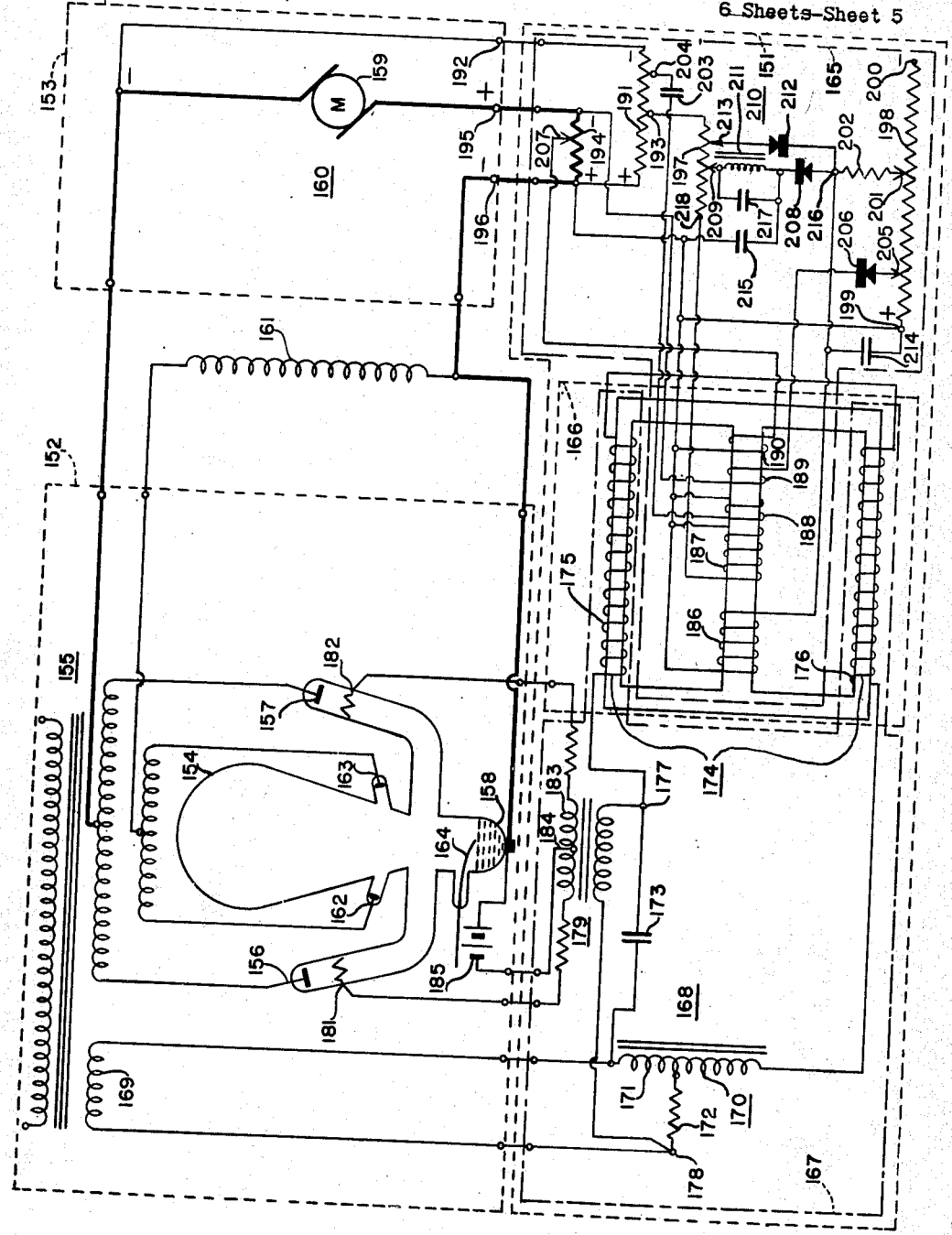
Figure 12:
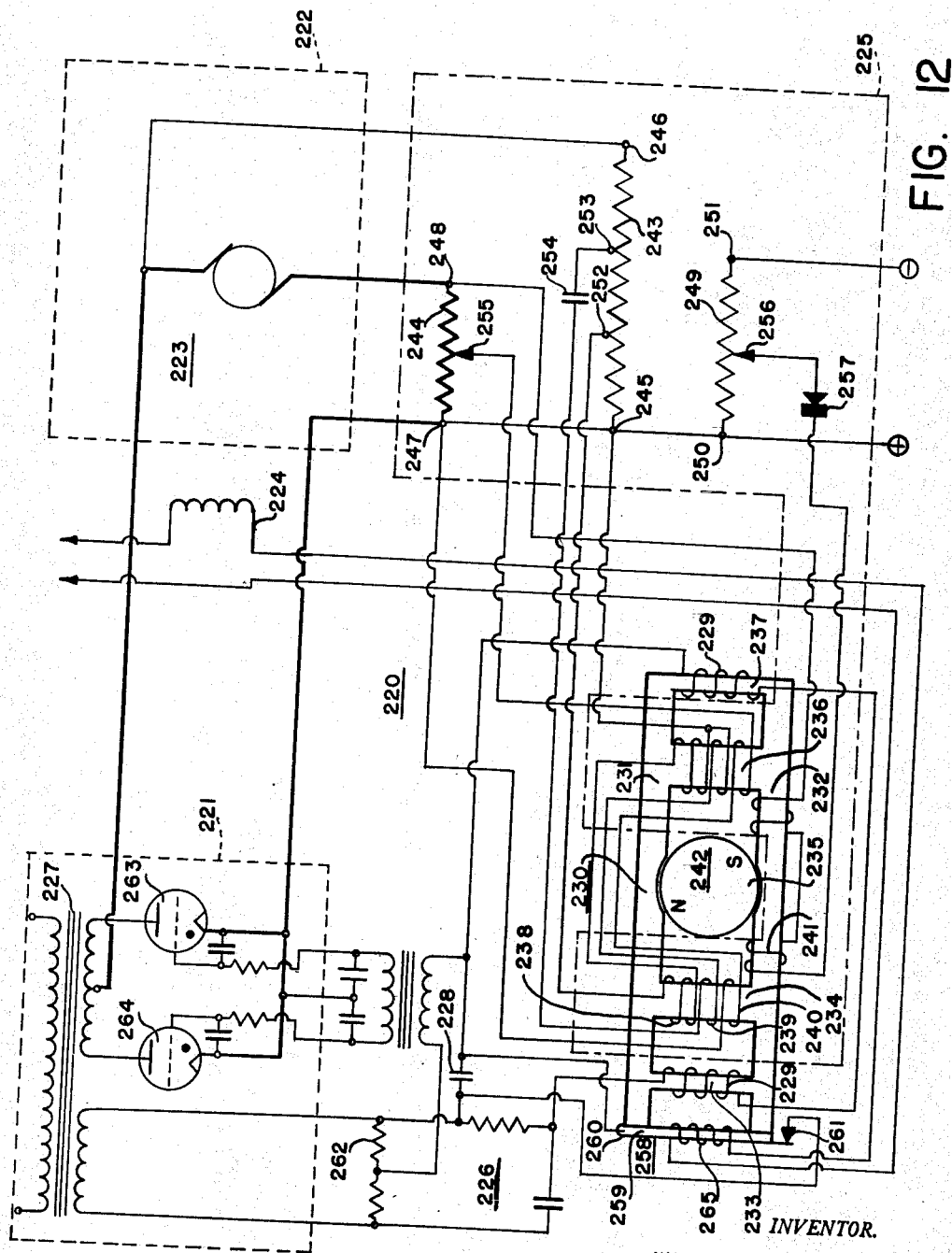

Figure 7 is a further modification of my control circuit wherein the controlling source of asymmetric magnetizing energy is a source of asymmetric electromotive force applied to a single direct current winding in opposition to the controlled asymmetric electromotive force through a series connected rectifier, wherein current limiting is obtained with the same winding and wherein the saturable reactor includes an additional anti-hunt winding;

Figure 8 is a modification of part of the circuit of Figure 7 wherein the load comprises the field winding of a direct current motor rather than the armature thereof and the rectifier in series with the direct current winding of the saturable reactor is accordingly reversed;

Figure 9 is a still further modification for the circuit arrangement of Figure 7 showing a motor field control arrangement having a rectifier in parallel rather than in series with the direct current winding of the saturable reactor;

Figure 10 is a further modification of my control circuit wherein generator field control is used, and one direct current winding on the saturable reactor is used for the resultant of the controlled and the controlling asymmetric electromotive forces and also has a rectifier paralleled thereacross, and further the saturable reactor has an antihunt winding;

Figure 11 is a still further development of the invention wherein the saturable reactor controls a mercury arc rectifier supplying power to a motor armature and wherein the controlling source of asymmetric magnetizing energy is an additional winding connected to a source of asymmetric electromotive force, and wherein the saturable reactor also has an antihunt winding, a current limit winding, and a compounding winding; and Figure 12 is a further development of my invention wherein the saturable reactor has a permanent magnet as the source of controlling asymmetric magnetizing energy and wherein a polarized armature is shown to inhibit reversal of the asymmetric magnetomotive force in the saturable reactor.

Figure 1:
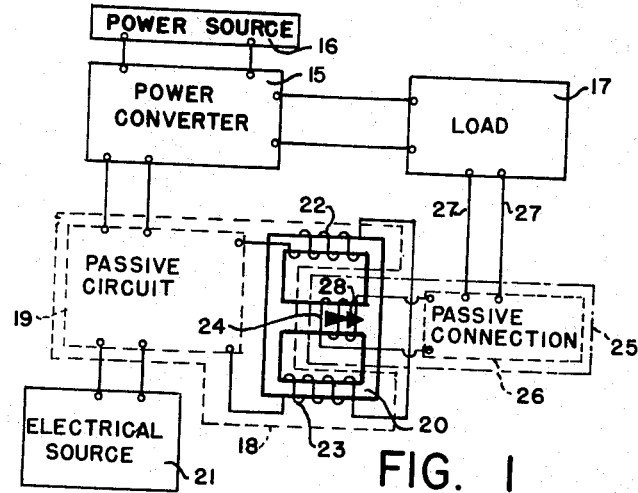
Figure 1 is a schematic block diagram of a load supplied with power from a power converter which is controlled by a saturable reactor in turn receiving controlled asymmetric magnetizing energy from the load, and controlling asymmetric magnetizing energy represented generically.

Figure 1 shows a block diagram of a power converter 15 deriving power from a power source 16 and supplying power to a load 17. The power converter 15 is controlled by a passive network 18 which includes generally a passive circuit 19 and the alternating current winding or windings 22 and 23 of a saturable reactor 20. An electrical source 21 supplies power to the passive network 18 for use in control purposes. The saturable reactor 20 includes an alternating current winding comprising coils 22 and 23 and a direct current winding 24. A second passive network 25 includes as part thereof the direct current winding 24 and a passive connection 26, which may be a direct pair of connections or which may include other passive circuit elements. The passive connection 26 is illustrative of a passive circuit or of a direct connection. The passive network 25 is adapted to develop in direct current winding 24 a controlled asymmetric voltage or current derived from the load 17 through leads 27 and passive connection 26, which controlled voltage or current is in accordance with some characteristic of the load, such as a terminal characteristic of an electrical load. This may be considered as a direct current feedback voltage, which means a controlled voltage having a direct current component and which is derived from the load. This results in the flow of an asymmetric current in the direct current winding 24 which establishes an asymmetric magnetomotive force in the core of the reactor, thus constituting means for establishing a controlled source of asymmetric magnetizing energy passively derived from the load. Additionally, a controlling source of asymmetric magnetizing energy is also provided, and is shown schematically as an arrow 28. Said controlling source of asymmetric magnetizing energy may take the form of a permanent magnet adjacent to or forming part of the core, or a source of asymmetric electromotive force connected to an additional winding on the core, or it may take the form of a direct current reference voltage or controlling asymmetric electromotive force which is applied to the passive network 25 so as to control the asymmetric current in the direct current winding 24. A direct current reference voltage may be defined as a reference voltage or controlling voltage having a direct current component.

Figure 2:
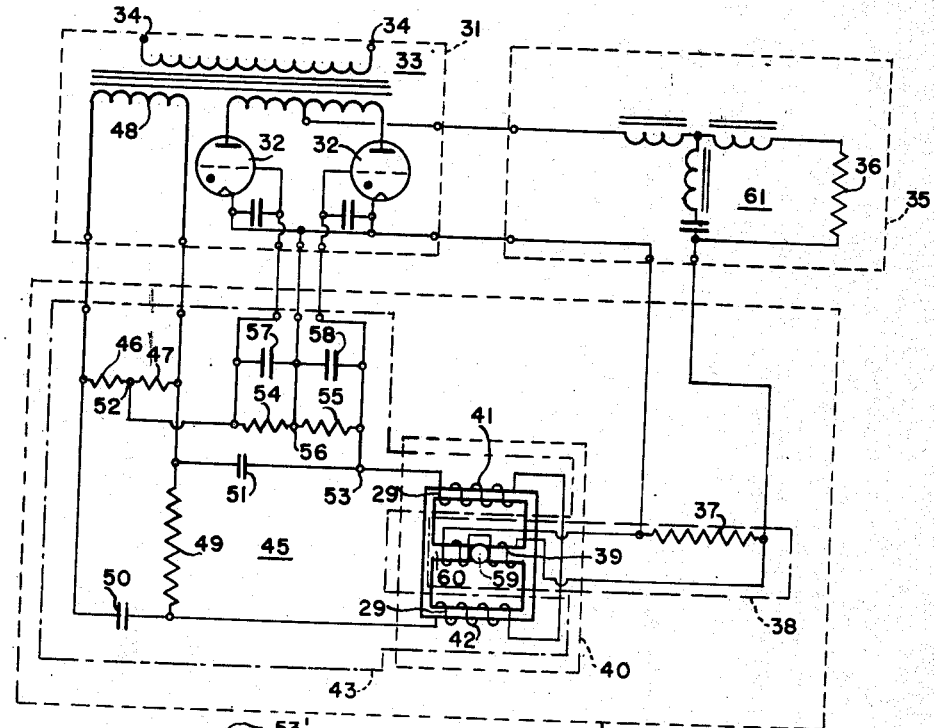
Figure 2 is a schematic diagram of a simplified circuit arrangement following the general arrangement of the block diagram of Figure 1, and including a permanent magnet in the saturable reactor as a source of controlling asymmetric magnetizing energy.

The Figure 2 shows a specific and simple circuit arrangement of the invention wherein a power converter 31 for the purpose of illustration has been shown as a full wave gaseous or vapor rectifier system employing space discharge tubes such as gaseous or vapor tubes 32 deriving alternating current power from a transformer 33 which is adapted to be connected at the terminals 34 to an alternating current source, not shown. The power converter 31 is adapted to supply rectified alternating current power to a load 35 shown specifically as the resistance 36.

The converter 31 is adapted to be controlled in this particular embodiment to apply a constant current to the load resistance 36. To this end a control resistance 37 is connected effectively in series with the load resistance 36 and forms part of a passive network 38. The passive network 38 also includes a direct current winding 39 of a saturable reactor 40 wherein the saturable reactor also has an alternating current winding 29 comprising coils 41 and 42, forming part of a second passive network 43. The passive networks 38 and 43 and the saturable reactor 40 comprise generally the control system 44. The passive network 43 is shown as a variable impedance network and in this particular embodiment is shown as a phase shifting network.

The passive network 43 is shown as including a phase shifter 45 which has resistances 46 and 47, preferably of equal resistance values, energized from a winding 48 on the transformer 33. A resistance 49 and a condenser 50 are connected across the serially connected resistances 46 and 47. Serially connected across the resistance 49 is a condenser 51 and the alternating current winding 29 of the saturable reactor 40. The output voltage of the phase shifter 45 which is shiftable in phase relative to the input voltage across the resistances 46 and 47 is obtained between the terminal 52, which is the junction of the resistances 46 and 47, and the terminal 53 which is the junction of the condenser 51 and the alternating current winding 29. Across these two terminals 52 and 53 is placed an impedance network having an effective center tap, such as a center tapped grid transformer. In this specific embodiment resistors 54 and 55 have been shown with a center tap 56. Condensers 57 and 58 are shunted across the resistors 54 and 55, respectively. The phase shiftable output voltage of the phase shifter 45 is thus obtained across the resistors 54 and 55 and is applied to the space discharge tubes 32 to control the firing angle thereof.

The saturable reactor 40 is shown as including a cylindrical permanent magnet 59 in the middle leg 60 of the core of this reactor 40. This permanent magnet 59 is magnetized across a diametral plane and is adapted to be rotated about its axis through 90 degrees, thus keeping the air gap between the permanent magnet and the middle leg 60 substantially constant but which upon rotation varies the asymmetric magnetizing energy applied to the saturable reactor 40. A filter circuit 61 is shown as a T-type filter and preferably is resonant at the main ripple frequency of the converter which for a 60 cycle alternating current input would be a 120 cycle ripple for the full wave rectifier system shown.

Figure 3:
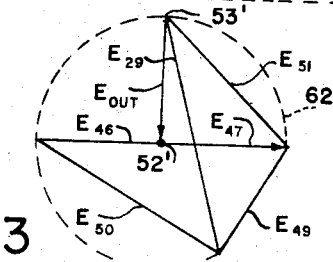
Figure 3 is a vector diagram of the voltage vectors obtainable from the phase shift circuit included in Figure 2.

The Figure 3 shows a vector diagram of the voltages obtainable across the phase shifter 45 with the vectors $E_{46}$ and $E_{47}$ being in series as the alternating current input voltage. The voltages $E_{50}$ and $E_{49}$ designate the voltages across the condenser 50 and resistance 49 which are serially connected across the alternating current input terminals. The condenser 51 and alternating current winding 29 have vectors $E_{51}$ and $E_{29}$ shown on the vector diagram as spanning the vector $E_{49}$. By variation of the impedance in the alternating current winding 29 the potential at the terminal 53 which is shown on the vector diagram as 53' may be varied relative to the voltage across the alternating current input vectors $E_{46}$ and $E_{47}$. The output voltage $E_{out}$ is shown as being between the points 52' and 53' with the point 52' near the center of a closed path 62 upon which lies the locus of the point 53'. This particular phase shifter is a specific embodiment of the various forms of phase shifting networks shown in my copending applications mentioned above. With the voltage vectors as shown in the Figure 3 it will be seen that the output voltage vector $E_{out}$ from the point 53' to the point 52' would lag the alternating current input voltage substantially 90 degrees and hence the tubes 32 would be delivering about half maximum output.

If the reactance of the alternating current winding 29 is increased beyond the value shown in Figure 3, the point 53' will be moved clockwise along the locus 62, and the output voltage vector $E_{out}$ will lag the alternating current input voltage vector $E_{46}$—$E_{47}$ by more than 90 degrees; by making the reactance of the winding 41—42 sufficiently high in relation to the reactance of condenser 51, the output voltage vector $E_{out}$ may be made to lag the alternating current input voltage vector $E_{46}$—$E_{47}$ by nearly 180 degrees so that the tubes 32 would be delivering substantially zero output. The "initial phase angle" between the output and input voltages, when no direct current magnetizing energy is applied to the saturable reactor, may accordingly be predetermined by designing the alternating current winding 29 to have the appropriate reactance values. Now, when direct current or asymmetric magnetizing energy is established in the core of the saturable reactor, the reactance of alternating current winding 41—42 will be diminished, point 53' will be moved anticlockwise along the locus 62, the lag of the output voltage 53'—52' with reference to the input voltage $E_{46}$—$E_{47}$ will be decreased, and the output of tubes 32 will be increased.

The control system shown in Figure 2 is designed to supply substantially constant current to the load resistance 36. As some condition in the system would change, such as a lowering of the impedance of the load resistance 36, more current would tend to flow to this load resistance, and hence a greater voltage drop would occur across the control resistance 37. This greater voltage drop across the resistance 37 would supply a greater voltage to the direct current winding 39. The increased voltage on the direct current winding 39 increases the asymmetric magnetomotive force supplied by such winding. The asymmetric magnetomotive force supplied by the permanent magnet 59 is preferably in opposition to the magnetomotive force supplied by the direct current winding 39 and overbalances such latter magnetomotive force so that the resultant asymmetric magnetomotive force applied to the core of the saturable reactor 40 is the difference between the two. Now when the voltage to the direct current winding 39 is increased this causes a decrease in the net resultant asymmetric magnetomotive force applied to the saturable reactor 40 which thus increases the impedance of the alternating current coils 41 and 42. This shifts the point 53' on the vector diagram of Figure 3 in a clockwise direction, thus making the output voltage of the phase shifter 45 more lagging to thus decrease the output of the converter 31. Conversely, if the impedance of the load resistance 36 increases, thus tending to reduce the load current, the voltage on the control resistance 37 decreases, the voltage on the direct current winding 39 decreases, the resultant asymmetric magnetomotive force on the saturable reactor 40 increases, the impedance of the alternating current coils 41 and 42 decreases and the firing angle of the converter tubes 32 becomes less lagging to thus apply a greater current to the load resistance 36.

Figure 4:
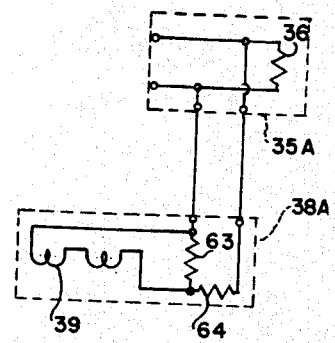
Figure 4 is a modification which may be substituted for part of Figure 2.

The Figure 4 is a modification which may be incorporated into the circuit of Figure 2 wherein the load resistance 36 is supplied with a substantially constant voltage. The circuit of Figure 4 shows the load 35A and a passive network 38A which may be substituted for the load 35 and passive network 38 in the circuit of Figure 2. The direct current winding 39 for the saturable reactor 40 is shown as before but is shown as being connected across a resistance 63 which is serially connected with another resistance 64 which series combination is paralleled across the load resistance 36. Thus, the direct current winding 39 is supplied with a voltage dependent upon the voltage applied to the load resistance 36 and by being connected across the resistance 63 may be considered as being effectively in parallel with the load resistance 36. A passive connection may be used rather than the passive network 38A by removing resistance 63 and replacing resistance 64 by a direct connection.

Figures 5, 6:
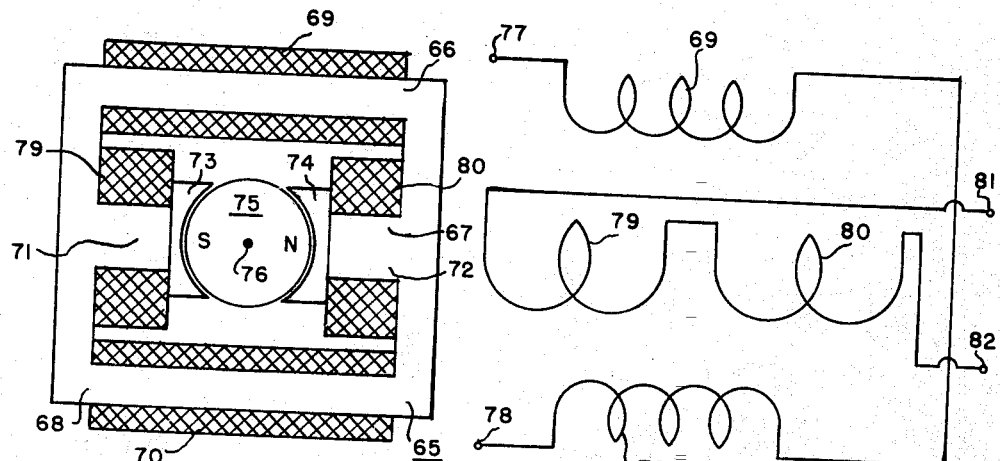
Figure 5 is a pictorial view of a saturable reactor having a rotatable cylindrical permanent magnet as a source of controlling asymmetric magnitized energy.
Figure 6 is a schematic wiring diagram for the windings of the saturable reactor shown in Figure 5.

Figure 5 shows a plan view of a specific form of saturable reactor 65, such as has been diagrammatically depicted in the circuit of Figure 2. The saturable reactor 65 includes a core, having generally first, second and third legs 66, 67 and 68 with first and second alternating current coils 69 and 70 wound about the first and third legs 66 and 68, respectively, and serially connected to form an alternating current winding. The middle leg 67 has first and second portions 71 and 72 terminating in first and second pole pieces 73 and 74. Direct current coils 79 and 80 are disposed about the first and second portions 71 and 72, respectively, of the second leg 67, and are serially connected to form a direct current winding. A permanent magnet 75 is shown as being cylindrical in form and as being magnetized across a diametral plane. The pole pieces 73 and 74 are adapted to have a partially cylindrical shape to conform to the cylindrical shape of the permanent magnet 75 and thus reduce the air gap therebetween. The permanent magnet is adapted to be rotated through 90 degrees about the axis 76 to thus shift the position of the poles of the magnet 75 relative to the pole pieces 73 and 74. By such a rotational shifting the asymmetric magnetizing energy supplied to the saturable reactor 65 may be varied at will.

The Figure 6 is a schematic wiring diagram of the connection of the various coils shown on the saturable reactor of Figure 5. As shown, the alternating current coils 69 and 70 are connected in series to form an alternating current winding across alternating current terminals 77 and 78 and the direct current winding comprises the two direct current coils 79 and 80 connected in series across the terminals 81 and 82. The terminals 77 and 78 may be those terminals which connect the alternating current winding of the saturable reactor 40 to the phase shifter 45 as shown in the Figure 2 and the terminals 81 and 82 may be such terminals as connect the direct current winding to the control resistance 37 of the passive network 38 as shown in the Figure 2.

The Figure 7 shows a more comprehensive control system 83 used to control the output of a power converter 84 comprising a controllable rectifier which supplies rectified alternating current power to a generator field 85 of a generator 86. The armature of the generator 86 may be driven by a separate electric motor or by a prime mover, not shown in the drawings. The generator 86 is considered as part of the converter 84 and supplies energy to a load 87 which is shown as including a motor armature 88 and a tachometer 89, and which may include a mechanical load, not shown. The motor armature 88 has a field 115 supplied from a separate source, not shown. The converter 84 is shown as including a controllable rectifier tube 90 being supplied with alternating current power through a transformer 91 from an alternating current source, not shown. A second rectifier tube 92 is not controlled but is a diode blocking rectifier to allow current to continue to flow in the inductive field winding during the reverse half cycle when the controllable tube 90 is not conducting. A phase shifter 45 is provided which operates in a similar way to the phase shifter 45 in the circuit of Figure 2. This phase shifter includes the alternating current winding 29 comprising coils 41—42 of a saturable reactor 93 as part of the phase shifter 45 which forms the passive network 43A. The reactance of the alternating current winding 29 is preferably made very high in relation to the reactance of condenser 51 so that the "initial phase angle" of the output voltage from the phase shifter approaches 180 degrees, so that the tube 90 delivers little, if any, output when no asymmetric magnetizing energy is applied to the core of the saturable reactor. The saturable reactor 93 includes the alternating current winding 29 and further includes a main direct current winding 95 and an antihunt winding 94. The antihunt and the main direct current windings 94 and 95 form part of a passive network 96. The passive network 96 includes a potentiometer 97 which is adapted to be energized from an asymmetric voltage source shown as the direct current battery 98. A control resistance 99 is connected effectively in series with the motor armature 88 and is shown as part of the passive network 96 since a voltage is developed thereacross which is proportional to the current and which is utilized in the control system 83 so as to control the converter 84 to limit the maximum current in the motor armature 88. The main direct current winding 95 has one end thereof connected to the control resistance 99 by the lead 100 and the other end thereof connected to a terminal 101 on the potentiometer 97 by the lead 102. The tachometer 89 has positive and negative terminals 103 and 104, respectively. A speed control tap 105 is provided on the potentiometer 97 and is connected to the negative terminal 104. The positive terminal 103 of the tachometer 89 is connected through a flux reversal prevention rectifier 106 and an optional resistor 107 to the main direct current winding 95. It will be noted that the voltage from the tachometer 89 and the voltage from the potentiometer 97 between the terminal 101 and the tap 105 are in voltage opposition so that the net voltage applied to the main direct current winding 95 is the difference between these two voltages.

The antihunt winding 94 is connected by an antihunt condenser 108 to the negative lead 109 of the armature circuit of the motor armature 88. The other end of the antihunt winding 94 is connected by a lead 110 to the positive terminal of the motor armature 88. A forward current limit rectifier 111 is provided between the lead 110 and a variable tap 112 on the potentiometer 97. Further, a reverse current limit rectifier 113 is connected between the lead 110 and a variable tap 114 on the potentiometer 97.

In operation, the speed control tap 105 obtains a controlling asymmetric electromotive force from the potentiometer 97 which is combined in opposition with a controlled asymmetric electromotive force from the tachometer 89 to thus produce a resultant asymmetric electromotive force. This resultant asymmetric electromotive force is applied to the main direct current winding 95. Preferably the voltage obtained from the potentiometer 97 exceeds that voltage obtained from the tachometer 89 such that the right end of the winding 95, as shown in Figure 7, is more positive than the left end thereof. This produces a resultant asymmetric magnetomotive force in the core of the saturable reactor 93. The voltage between the terminal 101 and the variable tap 105 may be considered as a reference or controlling voltage for establishing a given speed condition of the motor 88. This voltage may also be considered as a controlling source of asymmetric magnetizing energy. The tachometer voltage may likewise be considered as a controlled source of asymmetric magnetizing energy.

When the controlling voltage is zero, and the load voltage is zero, no current will flow through the winding 95, and accordingly the reactor will exhibit its maximum reactance and, according to the vector diagrams of Figure 3, the ignition angle will be retarded and, providing the circuits are correctly phased, the power converter will develop zero output, and a stable but inoperative condition will exist. If the controlling voltage is now increased, a current will flow through the winding 95 thus reducing the reactance of the alternating current winding 29 of the reactor and causing the ignition angle to advance and the converter 84 to develop an output voltage which will increase as the controlling voltage is increased. The direct current voltage applied to the winding 95 from the load, or in other words the controlled asymmetric voltage will, under these conditions, always remain somewhat below the controlling voltage and the difference therebetween will develop a current and therefore a magnetomotive force in the winding 95 sufficient to advance the ignition angle to the required degree. Owing to the high sensitivity of the phase shifting arrangement, a very small change in current in the winding 95 will produce a large change in the ignition angle, and consequently the direct current output voltage of the converter 84 will closely follow, or will be closely proportioned to, the controlling voltage, and furthermore the operation can be made to occur in a stable manner, any rise in controlling voltage being followed by a rise in direct current load voltage; any slow fall in controlling voltage will be followed by a fall in direct current load voltage. However, a sudden fall in controlling voltage may produce an unstable condition, especially if the direct current load is of a type involving electrical or mechanical inertia, for instance, if it is highly inductive, or if it comprises a rotating machine having mechanical inertia and developing a counterelectromotive force. In such instances, if the controlling voltage is decreased too suddenly, the direct current load voltage may be temporarily maintained for sufficient time for the controlling voltage to drop below the voltage derived from the load, thus reversing the current in the saturating winding and thereafter causing the saturating current to increase, thus decreasing the reactance, advancing the ignition angle, increasing the direct current converter output and causing instability and possible disaster.

According to a further feature of this invention, I prevent the accidental reversal of the saturating flux in the reactor by including a small rectifier, preferably a dry-plate rectifier 106, in series with the saturating winding.

The rectifier 106 is so polarized that current flows from left to right as shown in Figure 7, which means that electron current flows in the opposite direction. Thus as long as the right end of the rectifier 106 is negative relative to the left end current will flow in this loop which includes the tachometer 89, the potentiometer 97 and the direct current winding 95. However, should the voltage obtained from the tachometer 89 ever exceed the voltage from that portion of the potentiometer 97 which lies between the terminal 101 and the variable tap 105 this flux reversal prevention rectifier 106 will prevent current from flowing in this loop circuit and will accordingly prevent or inhibit reversal of the resultant asymmetric magnetomotive force in the saturable reactor 93; under these conditions, the resultant asymmetric magnetomotive force will fall substantially to zero instead of reversing, and the reactance of the alternating current winding 41—42 will increase to its maximum, thus retarding the ignition angle of the tube 90 and reducing the output of the converter 84 substantially to zero, whereupon the motor 88 will slow down until the output of tachometer 89 has fallen to a value less than that of the controlling voltage.

The antihunt winding 94 is provided to limit the hunting in speed of the motor armature 88. The antihunt condenser 108 will pass current only during changes of voltage, and hence the antihunt winding 94 will be asymmetrically energized only during speed or load changes, and such energization is so polarized to stabilize the changes of speed of the motor armature 88.

The current limit rectifiers 111 and 113 are provided to limit the current supplied by the converter 84 during forward and reverse current directions, respectively, in the motor armature 88. The forward current limit rectifier 111 obtains through the variable tap 112 an adjustable voltage which is negative relative to the potential at the terminal 101. A current limit controlled voltage is obtained from the control resistance 99 which will be positive at the left end thereof when the generator 86 is supplying current to the motor armature 88. Should the forward armature current increase until the sum of the voltage drop across the control resistance 99 and the voltage drop across the direct current winding 95 is approximately equal to the voltage drop between the terminal 101 and the variable tap 112 then the forward current limit rectifier 111 will pass current, which current will flow through the main direct current winding 95 and will oppose the resultant current in this winding 95 which is flowing because of the difference in voltage between the tachometer voltage and the speed controlling voltage from the potentiometer 97. By such forward current limit rectifier 111 the total current delivered to the load 87 is limited to a value as established by the setting of the variable tap 112. This is a safety precaution to protect the converter 84 and/or the load 87. The reverse current limit rectifier 113 will come into play during regeneration, such as when the motor armature 88 is being driven by an overhauling load. During such regeneration the voltage from the tachometer 89 will generally be in excess of the reference or controlling voltage obtained from the potentiometer 97 by the speed control tap 105 and the flux reversal prevention rectifier 106 will be in use to substantially prevent any resultant voltage being applied to the main direct current winding 95. If the motor armature 88 is being driven by an overhauling load the counterelectromotive force of the motor armature 88 will be greater than the applied electromotive force from the armature of the generator 86, and hence the flow of current will be reversed so that now current flows from the positive terminal of the motor armature, from right to left through resistor 99, into the positive terminal of the generator armature. This will accordingly reverse the voltage across the control resistance 99 to make such voltage positive at the right end thereof. If the right end of this control resistance 99 has a greater positive potential thereat than is obtained from the potentiometer 97 by the variable tap 114 relative to the terminal 101 then the reverse current limit rectifier 113 will conduct current through the main direct current winding 95 which will increase the asymmetric magnetomotive force in the core of the saturable reactor, thus decreasing the reactance of alternating current winding 29, advancing the ignition angle of tube 90, and so increasing the voltage applied to the generator field 85; hence, the generator 86 will develop an increased voltage which is in opposition to the counterelectromotive force of the motor armature 88 to thus limit the regenerative or reverse current caused by the counterelectromotive force of the motor armature 88.

The control resistance 99 and the resistances between potentiometer taps 101—112 and 101—113 should have a low resistance relative to that of the normal speed control circuit comprising the tachometer, the resistor 107 and the resistance between potentiometer taps 101—105 in order that the current limit control circuit may readily take command of the control system 83 when an excessive current condition is reached rather than to have the normal speed control circuit remain in command of the control system 83. It is for this reason that resistor 107 is preferably included in the circuit; however, if the remaining resistance values in the circuit are suitably proportioned, the resistor 107 may be omitted.

Figure 8 shows a modification for part of the circuit diagram shown in Figure 7, wherein a converter 116 supplies energy to a field 117 of a motor 118. The motor armature 119 is supplied from a separate source, not shown. The motor 118 drives a tachometer 89 for deriving a controlled asymmetric electromotive force across positive and negative terminals 103 and 104, respectively. The motor field 117, the mechanical load driven by the motor 118, not shown, and the tachometer 89 may be considered as the load 120 of the converter 116. The saturable reactor 93 has been shown as including only the main direct current winding 95 and the alternating current coils 41—42, but it is to be understood that these alternating current coils form part of the passive network 43A, such as is shown in Figure 7. However, in Figure 8, the reactance of the alternating current coils 41—42 should preferably be made considerably lower in relation to the reactance of capacity 51 than in Figure 7 so that the initial phase angle of the phase shifter output voltage approximates 90 degrees lagging in the absence of any asymmetric magnetizing energy in the core in order that the output of the converter 116 may never fall below a predetermined minimum value. A passive network 96A includes the main direct current winding 95 and the potentiometer 97. This potentiometer 97 is or may be the same as the potentiometer 97 of Figure 7, and is arranged for connection to a direct current or asymmetric voltage, not shown, which is positive at the left end thereof. A flux reversal prevention rectifier 121 and an optional resistor 122 are serially connected between the positive terminal 103 of the tachometer 89 and the left end of the main direct current winding 95. It will be noted that the flux reversal prevention rectifier 121 is reversed in polarity from the polarity of the flux reversal prevention rectifier 106 in the circuit of Figure 7. With either generator field control such as is shown in Figure 7, or with motor armature control, the flux reversal prevention rectifier would be connected with the polarity shown in Figure 7 so that in the conducting direction of such rectifier the controlled voltage or magnetizing energy (tachometer voltage in this case) is always less than the controlling voltage or magnetizing energy. This is because any decrease of speed of the motor must increase the difference between these quantities so as to increase saturation of the reactor and deliver more power from the converter to increase the speed. With motor field control, such as is shown in the modification of Figure 8, the flux reversal prevention rectifier 121 is connected so that in the conducting direction the controlled voltage or magnetizing energy is always greater than the controlling voltage because any decrease of speed must decrease the difference between these quantities so as to decrease saturation of the saturable reactor 93 and deliver less power to the motor field so as to increase the speed of the motor 118.

The circuit of Figure 9 is a still further modification of the circuit of Figure 7 wherein the power converter 116 supplies the load 120 as in the circuit of Figure 8, and wherein the initial phase angle of the phase shifter output is similar to that of Figure 8, so that the output of the converter 116 can never fall below a predetermined minimum value. The load 120 includes the tachometer 89 delivering a controlled voltage across the terminals 103 and 104 which controlled voltage is combined in opposition to the controlling voltage from the potentiometer 97 between the terminal 101 and the variable tap 105. The resultant of these two voltages, which is the difference therebetween, is applied to the main direct current winding 95 as in the circuits of Figures 7 and 8. The direct current winding 95 is wound upon the saturable reactor 93 and it is to be understood that the alternating current winding of such saturable reactor is used in a passive network such as the passive network 43A of the circuit of Figure 7 to control the converter 116. The direct current winding 95 and the potentiometer 97 are part of a passive network 96B, which passive network also includes a flux reversal prevention rectifier 123 and, optionally, a rectifier load resistor 124. The rectifier load resistor 124 interconnects the positive tachometer terminal 103 and the left end of the main direct current winding 95. The flux reversal prevention rectifier 123 is shunted across the direct current winding 95 and a portion of the potentiometer 97 between the terminal 101 and a variable tap 125. The tap 125 supplies a small biasing voltage to the rectifier 123 to maintain such rectifier at a voltage close to the conducting condition since a slight bias is needed on certain types of dry plate rectifiers before such rectifier will pass any substantial amount of current; under suitable conditions this bias may be omitted and points 125 and 101 may coincide. As in the circuit of Figure 8 the tachometer 89 is adapted to have, under normal working conditions, a larger voltage than the controlling voltage obtained from the potentiometer 97 by the variable tap 105. Again the difference between these two voltages is applied to the main direct current winding 95. The rectifier 123 comes into play only when the controlling voltage obtained by the variable tap 105 exceeds the voltage from the tachometer 89, such as when the variable tap 105 is rapidly moved to the right. Under such condition, the rectifier 123 will conduct current to thus substantially prevent any reversed voltage being applied to the direct current winding 95. The converter will thus deliver its predetermined minimum output to the motor field 117 to increase the speed of the motor 118, and hence the speed of the tachometer 89 to increase the output voltage thereof and re-establish a stable condition. If the current through the direct current winding 95 were permitted to reverse, then the resultant magnetomotive force in the saturable reactor 93 would reverse and thereafter increase, and the increasing magnetomotive force would increase the output of the converter 116 to increase the current to the field 117 thus decreasing the speed of the motor 118. This would further decrease the voltage output of the tachometer 89, further increasing the difference or resultant voltage between the tachometer voltage and the controlling voltage to thus further increase the reversed current applied to the main direct current winding 95, and thus further to increase the output of converter 116. This would continue until the converter 116 would be delivering its maximum output to the motor field 117, so that the motor 118 would be running at its minimum speed, despite the fact that the potentiometer tapping 105 had been moved to the right for the purpose of obtaining a larger controlling voltage and therefore a higher speed. The flux reversal prevention rectifier 123 prevents such undesirable condition.

Unfortunately, it is difficult to obtain a perfect rectifier, and, for instance, a selenium dry plate rectifier requires the application of a finite positive voltage of about 0.6 volts per plate before it conducts appreciably in the forward direction; the presence of such a voltage drop in series with the saturating winding may be undesirable in a highly sensitive system where an accurate balance is required between a controlling voltage and a controlled voltage derived from the load, particularly when the latter is derived from a tachometer and is therefore small in magnitude. Furthermore, it is believed that the voltage required to produce a given degree of forward conduction may vary during the life of the rectifier, so that when said rectifier is connected in series with the direct current saturating winding, as in Figures 7 and 8, the calibration of the converter output may vary.

In cases where a constant calibration of converter output against controlling voltage is required, the "reversal-preventing" rectifier should preferably be connected in parallel with the direct current saturating winding, as in Figure 9, so as substantially to short-circuit said winding if the voltage tends to reverse, while having substantially no effect while the voltage is in the correct sense. To ensure that the rectifier starts to conduct upon the application of even a very small reverse voltage, the rectifier may be biased to the sharpest point in its voltage-current curve, or to the steepest point or a steep point in its voltage-resistance curve. For selenium rectifiers the biasing voltage would be about 0.4 volts per plate. However, even when so biased, the rectifier curve may not be sharp enough to completely prevent reversal of flux.

If we bias the rectifier to +0.4 volts per plate and choose a rectifier of such plate area that its resistance then equals the resistance of the saturating winding, the rectifier will require a voltage change from +0.2 volts at which its resistance is 10 times as great (substantially non-conductive) to +0.6 volts at which its resistance is only 1/10 (substantially a short-circuit across the saturating winding). In other words, there will be a range of ±0.2 volts over which the rectifier will be partially conductive.

Accordingly, I propose to design the converter control system including the phase shifter with saturable reactor in such a way that there is no change of output or only a very small change of output from the converter when the voltage across the direct current saturating winding is below a predetermined value, amounting to 0.2 volts per plate when a selenium rectifier is used (probably less than this for a copper-oxide rectifier), while the converter output increases rapidly when the voltage applied to the saturating winding exceeds said predetermined value. In the case of a full-wave gas filled rectifier or similar converter circuit supplying an inductive load, this condition is easily obtained since the output is very small until the ignition angle approaches 90 degrees. In other cases, the condition may be obtained by suitable design of the saturable reactor.

Figure 10 shows a further modification of the invention wherein the converter 126 derives electrical power from an electrical source 127 through a transformer 128 and applies a rectified alternating current output to a generator field 129 of the generator 130. The generator armature 131 supplies a variable direct current voltage to a load indicated generally at 132 and which comprises a motor 133 having an armature 134 and a separately excited motor field 135. A control system 136 includes a passive network 43A comprising a phase shifter 45 and including the alternating current winding 29 of a saturable reactor 93, similar to those shown in Figure 7. A second passive network 137 includes the main direct current winding 95 and an antihunt winding 94 which are wound on the middle leg of the saturable reactor 93.

The passive network 137 includes a potentiometer 97 adapted to be energized from some unidirectional or asymmetric voltage source, such as by the battery 98. The main direct current winding 95 of the saturable reactor 93 is connected between the positive terminal 139 of the load and a terminal 138 on the potentiometer 97. The passive network 137 further includes a feedback or voltage potentiometer 140 which has the right end thereof connected to the negative terminal 141 of the motor armature 134. A series resistor 142 is provided in the motor generator loop circuit between the generator armature 131 and the motor armature 134 and such series resistor is considered as part of the passive network 137. A series potentiometer 143 is connected in shunt with the series resistor 142 in order to obtain finer graduations of voltage steps. The left end of the feedback potentiometer 140 is connected by a variable tap 144 to the series potentiometer 143. An intermediate terminal 145 on the feedback potentiometer 140 is connected by a variable tap 146 to the reference potentiometer 97. A reversal prevention rectifier 147 is connected between the positive terminal 139 of the load and a variable tap 148 on the reference potentiometer 97. An antihunt potentiometer 149 is connected in parallel with the field 129 of the generator 130 and a variable tap 150 obtains an adjustable voltage therefrom which is applied through the antihunt condenser 108 to the antihunt winding 94.

A feedback voltage in accordance with the voltage delivered to the motor armature 134 is obtained across the feedback potentiometer 140. A certain portion of this voltage, in this case that voltage obtained from the left end of the potentiometer 140 to the left of the intermediate terminal 145, may be considered as a voltage effectively in parallel with at least a part of the load. This feedback voltage is in opposition to a controlling voltage obtained from the left end of the potentiometer 97 between the terminal 138 and the variable tap 146. The reversal prevention rectifier 147 is provided to prevent reversal of the asymmetric magnetomotive force in the core of the saturable reactor 93 and accomplishes this result by effectively short-circuiting the direct current winding 95 should the controlling or reference voltage ever tend to become less than the controlled or feedback voltage from the feedback potentiometer 140. Should this condition occur, the rectifier 147 will conduct current to thus substantially short circuit the main direct current winding 95. The variable tap 148 is provided to establish a small biasing voltage on the rectifier 147 to bias this rectifier to the sharpest point on its voltage-current curve or to a steep point in its voltage-resistance curve.

The series potentiometer 143 may be considered as a resistance effectively in series with the load 132 and a voltage may be obtained from this potentiometer 143 by the variable tap 144. Such voltage may be used to obtain a compounding effect such that when the load current increases due to an increasing mechanical load on the motor 133 for example, the voltage drop across this potentiometer 143 will increase, thus to increase the resultant voltage applied to the direct current winding 95 and increase the output of the converter 126. In this arrangement of generator field control the controlled voltage from the feedback potentiometer 140 is arranged to be less than the controlling voltage from the reference potentiometer 97 thus making the right end of the main direct current winding 95 positive relative to the left end thereof. Hence the resultant or difference of these voltages is applied to the main direct current winding 95.

The circuit of Figure 11 shows a control system 151 as controlling a converter 152 which supplies rectified alternating current power to a load 153. The converter 152 includes a mercury arc rectifier 154 which has two main anodes 156 and 157 supplied from the transformer 155 and, in conjunction with the mercury cathode 158, supplies the rectified power to an armature 159 of a motor 160. The field 161 of the motor 160 is supplied from auxiliary anodes 162 and 163, which obtain their power from an additional winding on transformer 155. An ignition electrode 164 is provided in the mercury arc rectifier 154 with the ignition means, not shown. The control system 151 includes generally a passive network 167, a saturable reactor 166, and a second passive network 165. The passive network 165 comprises a phase shifter 168 which is similar to the phase shift circuits shown in the copending application Serial No. 770,966, filed August 28, 1947. A secondary winding 169 on the transformer 155 supplies energy to the phase shifter 168. An inductance 170 has an upper portion 171 thereof serially connected with a resistance 172 across the secondary winding 169 as a reference voltage for the phase shifter 168. A condenser 173 and an inductive reactance 174 are serially connected across the whole of the inductance 170. The inductive reactance 174 is shown as an alternating current winding on the saturable reactor 166, having a first coil 175 and a second coil 176. A terminal 177 is provided at the juncture of the condenser 173 and the inductive reactance 174 and a grid transformer 179 is connected between such terminal 177 and an end terminal 178 of the resistance 172. This grid transformer 179 supplies an output voltage shiftable in phase to the grids 181 and 182 of the mercury arc rectifier 154 from the secondary 183 of such grid transformer. The secondary 183 has a mid tap 184 which is connected to the mercury cathode 158 through a source of direct current biasing voltage, which is shown for convenience as a bias battery 185. The grid transformer 179 is preferably designed so that its core is sharply saturated by the current in its primary, whereby a sharply peaked output voltage is obtained from its secondary and applied to the grids 181 and 182.

The saturable reactor 166 includes the alternating current coils 175 and 176 on the outer legs thereof and a plurality of direct current windings forming part of the passive network 165 on the middle leg. The passive network 165 differs from the passive networks of Figs. 7, 8, 9 and 10, in that separate direct current windings are provided on the core of the saturable reactor for the purpose of establishing individual asymmetric magnetomotive force. These direct current windings include a controlling or reference winding 186, a controlled or feedback winding 187, an antihunt winding 188, a current limit winding 189 and a compounding winding 190. A feedback potentiometer 191 is connected between the negative terminal 192 of the motor armature 159 and the cathode 158 of the mercury arc rectifier 154 which is effectively the positive terminal of the converter 152. A series resistor 194 is connected in the loop circuit from the converter 152 to the motor armature 159 between the positive terminal 195 of the armature 159 and a terminal 196 of the load which is connected to the mercury cathode 158. The controlled or feedback winding 187 is connected between the terminal 196 through a biasing potentiometer 197 to an intermediate terminal 193 on the feedback potentiometer 191. This feedback potentiometer 191 supplies a controlled asymmetric electromotive force to the feedback winding 187 which thereby produces a controlled asymmetric magnetomotive force in the core of saturable reactor 166. Alternatively, the feedback winding 187 may be passively connected to the load or converter output, such as by direct connection to the terminals 192 and 196.

A controlling or reference potentiometer 198 is provided with a positive terminal 199 and a negative terminal 200 for connection to any suitable asymmetric electromotive force such as a direct current source, not shown, but which may conveniently be derived from the supply to field winding 161. This asymmetric voltage applied to the reference potentiometer 198 may be that derived from the auxiliary anodes 162 and 163 and as such would be in parallel with the field 161, and said reference voltage may be filtered by means, not shown. The controlling or reference winding 186 is connected between the positive terminal 199 of the reference potentiometer 198 and a variable tap 201, and a filter resistance 202 may be connected in series, and a filter condenser 214 in parallel, as shown. The antihunt winding 188 is connected between the terminal 196 and an intermediate tap 204 on the feedback potentiometer 191 through an antihunt condenser 203. The current limit winding 189 is connected between the positive terminal 195 and a variable tap 205 on the reference potentiometer 198 through a current limit rectifier 206. The compounding winding 190 is connected between the terminal 196 and a variable tap 207 on the series resistor 194. A reversal prevention rectifier 208 is connected between the variable tap 201 and a variable tap 209 on the biasing potentiometer 197 through the filter resistor 202 and a filter circuit 210. The filter circuit 210 includes an inductance 211 shunted by a capacitance 217, which are tuned to the predominant ripple frequency, such as 120 cycles, and further includes a capacitor 215 connected between the terminal 196 and the juncture of the reversal prevention rectifier 208 and the inductance 211. A voltage limiting rectifier 212 is connected between the negative terminal 216 of the reference winding 186 and a variable tap 213 on the biasing potentiometer 197.

In operation, the controlling or reference winding 186 has applied thereto from the reference potentiometer 198 a controlling asymmetric electromotive force which produces a controlling asymmetric magnetomotive force in the core of the saturable reactor 166. The controlled or feedback winding 187 has applied to it a controlled asymmetric electromotive force derived from the load, which produces a controlled asymmetric magnetomotive force in the core of the saturable reactor 166, which is in opposition to the controlling magnetomotive force supplied by the reference winding 186. The antihunt winding 188, as in previously described circuits, applies a magneto-
motive force to the saturable reactor which stabilizes any tendency to change a given condition. The current limit winding 189 because of its connection through the current limit rectifier 206, has no voltage thereon until the voltage across the series resistor 194 exceeds the voltage on that part of the reference potentiometer which lies between the positive terminal 199 and the variable tap 205. When such condition does occur an asymmetric current will flow through the current limit winding 189 and will apply an asymmetric magnetomotive force to the core of the saturable reactor 166 which is in opposition to the asymmetric magnetomotive force supplied by the reference winding 186. The compounding winding 190 has injected therein an asymmetric current which flows from the terminal 196 at the left side of series resistor 194 through the winding 190 to the variable tap 207. This current produces an asymmetric magnetomotive force in the saturable reactor 166 which is in addition to the magnetomotive force supplied by the reference winding 186 and which is proportional to the load current, so as to increase the resultant asymmetric magnetomotive force and thereby to increase the output of voltage of the converter 152 as the load current increases.

The vector diagram for the phase shifter 168 will be rather similar to the vector diagram shown in the Figure 3 and the phase shifter operates in substantially the same manner.

The asymmetric magnetomotive force from the reference winding 186 is designed to be greater than the opposing asymmetric magnetomotive force from the feedback winding 187, and hence overbalances the same to apply a resultant asymmetric magnetomotive force to the saturable reactor 166. Thus, when the speed of the motor 160 drops, less feedback voltage from the feedback potentiometer 191 is applied to the feedback winding 187, thus increasing the resultant asymmetric magnetomotive force and increasing the output of the converter 152 to apply a greater output to the motor armature 159. Since the asymmetric magnetomotive force from the current limit winding 189 is in opposition to the asymmetric magnetomotive force from the reference winding 186 when the current limit rectifier 206 is conducting, the asymmetric magnetomotive force from the current limit winding will decrease the resultant asymmetric magnetomotive force in the core of saturable reactor 166 to decrease the output of the converter 152. By suitably proportioning the windings, it may be arranged that the resultant asymmetric magnetomotive force is thereafter sharply reduced and that the output of the converter 152 is thereby sharply limited.

The current limiting rectifier 206 will come into operation when the motor 160 is pulling an excessive load. The current which flows through the current limit winding 189 will reduce the resultant magnetomotive force in the core of the saturable reactor; hence, reducing the output of the converter 152 to reduce the speed of the motor 160. This will reduce the voltage applied from the feedback potentiometer 191 to the feedback winding 187. This will reduce the magnetomotive force produced by this winding which will, to some extent, negate the effect of the magnetomotive force from the opposing current limit winding 189, and hence keep the resultant magnetomotive force from decreasing as sharply as desired. To improve the functioning of the current limit rectifier 206, the voltage limiting rectifier 212 has been added to the circuit as a form of shunt for the feedback winding 187 and the reference winding 186. Normally for the motor armature type of control, shown in this Fig. 11, the negative terminal 216 of the reference winding 186 will be more negative than the positive terminal 218 of the biasing potentiometer 197 in order to make the resultant magnetomotive force in the same sense as that produced by the reference winding 186. By connecting the voltage limiting rectifier 212 through the variable tap 213 to a point on the biasing potentiometer 197 which is negative relative to the terminal 218, the voltage limiting rectifier 212 will normally not conduct. Now, when the current limit rectifier 206 conducts which ultimately results in decreased voltage on the feedback winding 187 as previously described the tap 193 on the feedback potentiometer 191 will become more positive to thereby permit the voltage limiting rectifier 212 to pass current, and hence to reduce the voltage applied to the reference winding 186 and to inhibit further reduction of voltage across the feedback winding 187. This will reduce the resultant magnetomotive force in the core of the saturable reactor 166 to thus reduce the output of the converter 152. It will thus be seen that the voltage limiting rectifier 212 limits the voltage difference between the terminals 216 and 218, or in other words, limits the difference between the voltages applied to the reference winding 186 and to the feedback winding 187 and therefore limits the resultant magnetomotive force developed by said opposed windings 186 and 187, to thereby permit the current limiting rectifier to function in its proper manner.

The asymmetric magnetomotive force produced by the compounding winding 190 is in addition to the asymmetric magnetomotive force of the reference winding 186; hence, as the mechanical load of the motor 160 increases (so as to increase its armature current), the current to the compounding winding 190 from the series resistor 194 will increase, thus increasing the resultant asymmetric magnetomotive force in the core, and so increasing the output voltage of the converter 152. The reversal prevention rectifier 208 is effectively connected across one end of the reference and feedback windings 186 and 187, the other ends of these windings being connected together. Th biasing potentiometer 197 is adapted to provide the initial bias upon this reversal prevention rectifier 208 so that the rectifier may become fully conducting upon the slightest tendency for the voltage difference across these two windings to reverse the resultant asymmetric magnetomotive force. In practice, this biasing potentiometer 197 can apply either a positive or a negative bias since the feedback winding 187 is preferably selected to have a lower resistance than the reference winding 186 though equal in turns by choosing the feedback winding 187 to be an inner coil having smaller radius and therefore smaller resistance than the reference winding 186. The filter circuit 210 and the filter condenser 214 and resistor 202 are provided to minimize the ripple across the rectifier 208 so that it may be more fully effective. Preferably, the inductance 211 and capacitance 217 comprise a resonant circuit resonant to the ripple frequency which will be twice the frequency of the alternating current applied to the converter 152 and said resonant circuit is used together with the capacitor 215 to filter the ripple across the feedback winding 187. The filter capacitor 214, in conjunction with the resistor 202 which may in some cases be omitted, filters the ripple which is induced into the reference winding 186 from the feedback winding 187, and also filters any ripple which may be present in the asymmetric electromotive force which is applied to the reference potentiometer 198.

The circuit of Figure 12 shows a control system 220 which in general functions somewhat similarly to the control system of the Figure 2. The control system 220 controls a converter 221 which supplies rectified alternating current power to a load 222. The load 222 is shown as a motor 223 having a separately excited field 224. The control system 220 includes generally a passive network 225 comprising a phase shifter 226 which is similar to the phase shifter used in the Figure 2. The converter 221 includes a transformer 227 which supplies energy to the rectifier tubes within the converter as well as to the phase shifter 226. The phase shifter 226 is similar to the phase shift circuit shown and described in my copending application Serial No. 779,909, filed October 15, 1947. The phase shifter 226 includes a condenser 228 and an inductance 229 which are relatively variable to shift the phase of the alternating current voltage, and hence control the output of the converter 221. In this embodiment the inductance 229 is shown as being the alternating current winding of a saturable reactor 230. The saturable reactor is designed with a permeable core which includes first and second magnetic or permeable rails or yokes 231 and 232 with first, second, third, fourth and fifth legs 233–237, inclusive, paralleled between these yokes. The first and fifth legs 233 and 237 are designed to be saturable by having a small cross sectional area and upon these legs are wound the alternating current winding 229 which is the variable inductance of the phase shifter 226. Actually, there are two separate coils forming this alternating current winding 229 but it will be understood that one coil or any number of coils may constitute such winding.

The second and fourth legs 234 and 236 preferably have a larger cross sectional area than the first and fifth legs so that the flux density in these second and fourth legs will not saturate these legs under normal operating conditions. The second and fourth legs are designed to accommodate a plurality of direct current windings which form part of the passive network 225. Generally, each of the direct current windings comprises two coils, one on each of the second and fourth legs 234 and 236. As shown in the Figure 12, the second and fourth legs have wound thereon first, second and third direct current windings 238, 239 and 240, respectively. A fourth direct current winding 241 is wound upon the second magnetic yoke 232 between the second and fourth legs, and it likewise is split into two coils, one on each side of the third leg 235.

The third leg has been shown as comprising a cylindrical permanent magnet 242 capable of being revolved about its axis. The permanent magnet 242 is polarized, not lengthwise of the cylinder, but crosswise, so that the north pole lies near a generating line in the surface of the cylinder, and the south pole lies near a diametrically opposite line in the surface of the cylinder. It will be obvious that the third leg could have short protuberances from the magnetic yokes 231 and 232 forming an opening therebetween with the permanent magnet 242 in such opening. The preferred design shown in Figure 12 permits the permanent magnet 242 to be as large as possible, and hence have a maximum of magnetizing energy.

The load 223 has a feedback impedance 243 paralleled thereacross and a series impedance 244 in series therewith for obtaining voltages corresponding to load conditions. The feedback impedance 243 has positive and negative terminals 245 and 246, respectively, and the series impedance 244 likewise has positive and negative terminals 247 and 248, repsectively. A current limit potentiometer 249 having positive and negative terminals 250 and 251 is adapted to be connected to an external source of direct current or asymmetric voltage. The positive terminal 250 is connected to the positive terminal 245 of the feedback potentiometer 243, and hence it will be seen that the potentiometers 249 and 243 could be combined into one.

The first direct current winding 238 may be considered as a voltage feedback winding and is connected to a tap 252 on the feedback potentiometer 243. The positive terminals 245, 247, and 250 are intereconnected to establish a reference potential. Thus, the tap 252 will be negative relative to the point of reference potential. The other end of the first direct current winding 238 is connected to the positive terminal 245 or the point of reference potential. The second direct current winding 239 may be considered as an antihunt winding and is connected between the point of reference potential and a tap 253 on the feedback potentiometer through an antihunt condenser 254. The third direct current winding 240 may be considered as a compounding winding and is connected between the point of reference potential at terminal 247 and a variable tap 255 on the series impedance 244. The fourth direct current winding 241 may be considered as a current limit winding and is connected between the negative terminal 248 of the series impedance 244 and the variable tap 256 on the current limit potentiometer 249 through a current limit rectifier 257.

The permanent magnet 242 is designed to have a magnetizing energy sufficient to exceed the magnetizing energy supplied by the feedback winding 238. The flux produced by the magnetizing energy from the feedback winding 238 is designed to act as a shunt for the flux from the permanent magnet 242 and hence divert magnetic lines of force from the first and fifth legs 233 and 237. Since the magnetizing energy from the feedback winding 238 is less than the magnetizing energy from the permanent magnet 242 it cannot shunt or divert all of the magnetic lines of force, and hence the difference between these two energies will allow a resultant flux to flow in the first and fifth legs 233 and 237, thus resulting in a given degree of asymmetric saturation of these legs during normal operating conditions.

Thus, the saturable reactor 230 may be considered to have a shunt magnetic circuit rather than a series magnetic circuit since a resultant or differential flux is achieved by the shunting of the flux from the permanent magnet 242 rather than by serially opposing its magnetomotive force. The permanent magnet 242 may be considered as the controlling magnetizing energy and the energy from the feedback winding 238 may be considered as the controlled magnetizing energy. The fact that the cylindrical permanent magnet 242 is revoluble on its axis permits the amount of controlling magnetizing energy to be varied, and thus the resultant or differential flux applied to the first and fifth legs 233 and 237 can be varied. By such variation the alternating current impedance of the alternating winding 229 will vary, and thus control the phase shifter 226. The permanent magnet 242 has been shown in about an "11 o'clock" position, and if it is rotated in the clockwise direction more magnetizing energy will be applied to the entire saturable reactor 230, thus increasing the resultant flux density in the first and fifth legs 233 and 237, thus decreasing the impedance of the inductance 229 which will shift the phase of the output voltage of the phase shifter 226 in a more leading direction to thus increase the output of the converter 221 which will increase the speed of the motor 223. Conversely, counterclockwise rotation of the permanent magnet 242 will reduce the speed of the motor 223.

The antihunt winding 239 being connected through the antihunt condenser 254 will be responsive only to changes of voltage across the feedback potentiometer 243, and hence will introduce into the saturable reactor 230 a flux component which is dependent only on changes of said voltage for the purpose of stabilizing the operation of the system. The compounding winding 240, since it obtains a voltage from the series impedance 244, will introduce into the saturable reactor a flux component which is proportional to the current applied to the load and this flux component will be in opposition to that applied by the feedback winding 238 which will have the effect of increasing the resultant asymmetric flux in the first and fifth legs 233 and 237, thus increasing the converter output. The current limit winding 241 in normal operation has no voltage impressed thereon since the rectifier 257 prevents current flow until the voltage across the series impedance 244 exceeds the voltage on the current limit potentiometer 249 between the positive terminal 250 and the variable tap 256. When such event occurs, the terminal 248 will be more negative than the variable tap 256, permitting the rectifier 257 to conduct and the current limit winding 241 then impresses a magnetomotive force upon the saturable reactor 230 which opposes the magnetizing energy from the permanent magnet 242, thereby limiting the output of the converter 221 or the speed of the motor 223 to some safe value. The tap 256 is made variable to regulate the point at which this current limiting effect will occur.

A safety feature has been added to the saturable reactor 230 which includes generally a polarized control means 258 having two conditions and being responsive to a tendency toward reversal of the resultant flux in the first leg 233 to change from one to the other of these conditions. The control means 258 in this Figure 12 is shown as a magnetically polarizable armature 259. The armature 259 is pivoted at 260 near its upper end so that the lower end is free to be attracted to the second magnetic yoke 232. Contacts 261 are actuated by the armature 259 and are shown in the normally closed position with the armature 259 attracted to the second magnetic yoke 232 which normally is a south pole, thus providing the attraction. The contacts 261 are connected across the condenser 228 so that when the contacts 261 are closed, the output voltage of the phase shifter 226 is equal to the voltage across resistor 262 and the voltage applied to the grids of the converter tubes 263 and 264 lag the voltages applied to their anodes by 180 degrees, thus shutting off any output from the converter 221. A coil 265 is connected, preferably in series with the motor field 224 so as to polarize the armature 259 with a south pole at its lower, free end, only when said field 224 is energized. Upon such polarization, the armature 259 is repelled by the magnetic field existing across the leg 233 of the core, which has a south pole at its lower end due to the permanent magnet 242. Thereafter, the converter 221 can supply power to the load and this will result in an opposing magnetization of the leg 233 which, however, will not normally alter the direction of such magnetization, and accordingly the armature will normally remain repelled and the contacts 261 will remain open. The control means 258 provides an additional safety feature in the event that the permanent magnet 242 should be rapidly rotated in a counterclockwise direction when the load 222 has either high mechanical or electrical inertia. Under such condition, it would be possible that the voltage applied to the feedback winding 238 could produce a flux which will not decrease as fast as the rapidly decreasing flux from the permanent magnet 242 and thus it may be possible for the resultant flux passing through the leg 233 to be reversed. Upon such reversal of the resultant flux in the first and fifth legs 233 and 237 an unstable condition would result, for any slight increase in resultant flux would decrease the impedance of the inductance 229 thus increasing the output of the converter 221 to increase the voltage applied to the feedback winding 238, thus increasing the resultant flux still further. The control means 258 prevents any disastrous occurrences because should the magnetizing energy produced by the feedback winding 238 exceed the magnetizing energy from the permanent magnet 242 for any reason, the left end of the second magnetic rail 232 would then become polarized with a north pole which would attract the polarized armature 259. The armature would then pivot towards the rail or yoke 232 to close the contacts 261 and thus short the condenser 228. Upon shorting the condenser 228, the output of the converter 221 will be reduced to a minimum value.

In certain applications, for example, where the converter 221 is supplying energy to the field of a motor, it will then be necessary to reverse the resultant flux in the legs 233 and 237 under conditions of normal operation. This is because with increasing field on a motor the speed decreases, and vice versa. Such an arrangement would produce a resultant flux in the legs 233 and 237 which is in the same direction as the flux which would be produced by the winding 238 alone. In this case the permanent magnet 242 may be considered as a shunt for part of the flux produced in the legs 234 and 236 by the feedback winding 238, and the remaining magnetic lines of force from the said legs 234 and 236 will circulate through the legs 233 and 237.

The operation of this particular circuit arrangement would be such that when the motor speed decreases, as with increasing load, the voltage applied to the feedback winding 238 would decrease, thus decreasing the resultant flux in the legs 233 and 237 to decrease the output of the converter 221, and hence increase the speed of the motor. It will be seen that the polarity of the magnetic yokes 231 and 232 will be reversed, and hence the polarity of the polarized armature 259 should likewise be reversed in order that this movable north pole of the armature 259 will be repelled by the magnetic yoke 232. The leads from the contacts 261 then should be provided to short the alternating current winding 229 rather than short the condenser 228 so that the converter output will increase to a maximum upon reversal of the resultant flux in the leg 233, and hence apply full field to the motor to reduce its speed to a minimum.

In this arrangement, it is preferable that the polarizing coil 265 should be connected to a separate source of asymmetric current and not in series with the motor field.

The claims appended hereto are made a part of the disclosure of this specification; and are incorporated herein by reference.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. A control system for a power converter supplying electric power to a direct current motor having an armature, comprising a saturable reactor having an alternating current winding as a variable inductance forming part of a phase shifting network connected to an alternating current source and to said converter, said saturable reactor having a magnetizable core and a direct current winding, a first source for developing a first controlling asymmetric electromotive force, a direct current tachometer driven from said armature for developing a first controlled asymmetric electromotive force, an impedance effectively in series with the armature for developing a second controlled asymmetric electromotive force, connections between said first source, said tachometer and said direct current winding whereby the resultant of the first controlling and first controlled electromotive forces is applied to said direct current winding, a second source for developing a second controlling asymmetric electromotive force, a nonamplifying rectifier, and connections between said rectifier, said impedance, said second source, and said direct current winding, whereby said second controlled electromotive force may act in opposition to said first controlling electromotive force to limit the output of the converter in accordance with said second controlling electromotive force.

2. An electrical control system for a power converter for supplying electric power to a load, comprising a phase shifting network operable from an alternating current source and controlling said converter, said phase shifting network including a series circuit having first and second end terminals and a first output terminal, a capacitive impedance connected between said first end and first output terminals, and a variable inductive reactor connected between said second end and first output terminals, means for applying to said end terminals a reference voltage derived from said A. C. source such that the potential of said first output terminal lies, in a voltage vector diagram, on an arc spanning the reference voltage vector, circuit elements energized from said A. C. source, a second output terminal associated with said circuit elements such that the potential of said second output terminal lies, in the vector diagram, within the space bounded by said reference voltage vector and said arc, said control system also including means for establishing a controlling quantity for said inductive reactor, means for establishing a controlled quantity representative of an operating condition of the load, non-amplifying means for combining said quantities to produce a resultant asymmetric magnetomotive force in said inductive reactor in dependence on the difference between said quantities, and polarized control means to inhibit the effect of reversal of the asymmetric magnetomotive force.

3. The combination of claim 2 wherein the inductive reactor includes a permeable core and a D. C. winding thereon and the resultant asymmetric magnetomotive force is produced in the core by supplying to said D. C. winding a resultant voltage comprising the difference between a controlling voltage and an opposing voltage derived directly from the load.

4. The combination of claim 3 wherein the polarized control means prevents reversal in direction of the resultant asymmetric magnetomotive force in said core.

5. The combination of claim 4 wherein said controlling and controlled quantities are voltages and wherein said polarized control means is a rectifier connected in circuit with said D. C. winding so as to prevent reversal of the resultant voltage obtained by combining controlling and controlled voltages.

6. The combination of claim 5 wherein the rectifier is connected in series with said D. C. winding.

7. The combination of claim 5, including an antihunt winding on said core, and a capacitor in series with said antihunt winding.

8. The combination of claim 5, including means for deriving a second controlled voltage from said load indicative of the load current, a second source of controlling voltage, a second rectifier, and circuit means for combining said second controlled and controlling voltages and applying same through said second rectifier to a winding on said core.

9. A control system for a power converter supplying electric power to a load, comprising a saturable reactor having an alternating current winding as a variable inductance forming part of a phase shifting network connected to an alternating current source and to said converter, said saturable reactor having a magnetizable core and a direct current winding, a source of reference electromotive force having a direct current component, a first source of feedback electromotive force having a direct current component, an impedance effectively in series with the load and forming a second source of feedback electromotive force having a direct current component, conductive connections between said sources and said direct current winding whereby the resultant of said electromotive forces is applied directly to said direct current winding, and a nonamplifying rectifier connected in series with said direct current winding to minimize reversal of the asymmetric magnetomotive force in said core, the output of the phase shifting network controlling the power to the load.

10. A control system for a power converter supplying electric power to a load, comprising a saturable reactor having an alternating current winding as a variable inductance forming part of a phase shifting network connected to an alternating current source and to said converter, said saturable reactor having a magnetizable core and a direct current winding, a first source of reference electromotive force having a direct current component, a first source of feedback electromotive force having a direct current component, conductive connections between said first sources and said direct current winding whereby the resultant of the electromotive forces from said first sources is applied to said direct current winding, an impedance effectively in series with the load and forming a second source of feedback electromotive force having a direct current component, a second source of reference electromotive force having a direct current component, a nonamplifying rectifier, and connections between said second rectifier, said second sources and said direct current winding whereby the electromotive forces from said second sources may act in opposition to each other to limit the output of said converter, the output of the phase shifting network controlling the power to the load.

11. A control system for a power converter for supplying electric power from an alternating current source to a load, comprising, a phase shifting network connected to said alternating current source and having an output, including a saturable reactor having an alternating current winding as a variable inductance forming part of said phase shifting network, a magnetizable core in said reactor, a reference voltage having a direct current component to produce an asymmetric magnetizing energy, a feedback voltage having a direct current component to produce a controlled source of asymmetric magnetizing energy conductively derived from the load, and means for combining said magnetizing energies to apply a resultant asymmetric magnetomotive force to the core, the output of the phase shifting network controlling the power to the load.

12. A control system for a space discharge device supplying rectified alternating current power from an alternating current source to a load, comprising a phase shifting network having an output and including an alternating current winding of a saturable reactor as a variable inductance, means for connecting said phase shifting network to said alternating current source, a magnetizable core in said reactor, a reference voltage having a direct current component to produce an asymmetric magnetizing energy, a direct current winding on said core adapted to be conductively connected to said load for deriving a feedback voltage having a direct current component to produce a controlled source of asymmetric magnetizing energy, and means for combining said energies to produce a resultant asymmetric magnetomotive force in the core, the output of the phase shifting network controlling the power to the load.

13. In a control system for a space discharge device supplying rectified alternating current power from an alternating current source to a load which has the property of a countervoltage, a phase shifting network including an alternating current winding of a saturable reactor as a variable inductance, means for connecting said phase shifting network to said alternating current source, a magnetizable core in said reactor, a reference voltage having a direct current component to produce an asymmetric magnetizing energy, a direct current winding on said core adapted to be conductively connected to said load for deriving a feedback voltage having a direct current component to produce a controlled source of asymmetric magnetizing energy, means for combining said magnetizing energies to apply a resultant asymmetric magnetomotive force to the core, the output of the phase shifter controlling the power to the load, and output control means to dominate the control of the power supplied to the load upon a tendency toward reversal of the resultant asymmetric magnetomotive force in the core.

14. A control system for a power converter for supplying electric power from an alternating current source to a load, comprising, a phase shifting network connected to said alternating current source and having an output for controlling the power to the load, including a saturable reactor having an alternating current winding as a variable inductance forming part of said phase shifting network, a magnetizable core in said reactor, and a direct current winding upon said core, a source of reference voltage having a direct current component, a source of feedback voltage having a direct current component derived by conductive connection from the load, said direct current winding being conductively connected between said sources of reference voltage and feedback voltage through a rectifier to inhibit the reversal of current in said direct current winding, the output of the phase shifting network controlling the power to the load.

15. A control system for a power converter for supplying electric power from an alternating current source to a load, comprising, a phase shifting network connected to said alternating current source and having an output for controlling the power to the load, including a saturable reactor having an alternating current winding as a variable inductance forming part of said phase shifting network, a magnetizable core in said reactor, and a direct current winding upon said core, a source of reference voltage having a direct current component, a source of feedback voltage having a direct current component derived by conductive connection from the load, said direct current winding being conductively connected to said sources of reference and feedback voltage, the output of the phase shifting network controlling the power to the load.

References Cited in the file of this patent

UNITED STATES PATENTS

| Number | Name | Date |
|---|---|---|
| 2,260,012 | Edwards | Oct. 21, 1941 |
| 2,278,151 | Runaldue | Mar. 31, 1942 |
| 2,399,266 | Stiefel | Apr. 30, 1946 |
| 2,472,538 | Krauer et al. | June 7, 1949 |
| 2,519,339 | Avery | Apr. 22, 1950 |
| 2,583,731 | Elliott | Jan. 29, 1952 |

FOREIGN PATENTS

| Number | Country | Date |
|---|---|---|
| 361,984 | Italy | Aug. 9, 1938 |